United States Patent [19]

Shriver et al.

[11] Patent Number: 4,942,955

[45] Date of Patent: * Jul. 24, 1990

[54] CONTAINER TRANSFER SYSTEM

[75] Inventors: Frank L. Shriver, Lakewood; Robert H. Schultz, Broomfield, both of Colo.

[73] Assignee: Adolph Coors Company, Golden, Colo.

[*] Notice: The portion of the term of this patent subsequent to Sep. 20, 2005 has been disclaimed.

[21] Appl. No.: 216,231

[22] Filed: Jul. 7, 1988

Related U.S. Application Data

[63] Continuation-in-part of Ser. No. 69,397, Jul. 1, 1987, Pat. No. 4,771,879.

[51] Int. Cl.⁵ .............................................. B65G 47/91
[52] U.S. Cl. ................................. 198/471.1; 198/438; 198/441; 198/803.5
[58] Field of Search ...................... 198/404, 408, 471.1, 198/682.1, 803.5, 438, 440, 441; 101/37, 38 R, 38 A, 39, 40

[56] References Cited

U.S. PATENT DOCUMENTS 4,771,879 9/1988 Shriver .............................. 198/471.1

FOREIGN PATENT DOCUMENTS 1632238 12/1970 Fed. Rep. of Germany ...... 198/441
0590207 1/1978 U.S.S.R. .............................. 198/441

Primary Examiner—Robert J. Spar
Assistant Examiner—Lyle Kimms
Attorney, Agent, or Firm—Klaas & Law

[57] ABSTRACT

A transfer system for transferring decorated containers, having images of wet ink on the outer peripheries thereof, from a first container carrying apparatus, comprising a continuously rotating mandrel wheel type apparatus carrying decorated containers with their open ends exposed, to second and third container carrying apparatus, each comprising continuously moving vacuum belts for carrying the decorated containers through a curing oven with their open ends exposed, comprising a continuously rotating transfer wheel which carries the decorated containers with their closed ends exposed and which is located between the first and the second and third container carrying apparatus and wherein the transfer wheel receives containers from the first container carrying apparatus for movement in a circular path and moves the containers while they are held thereon so that they are separated into two parallel spaced apart circular paths to be transferred to the second or third container carrying apparatus.

12 Claims, 10 Drawing Sheets

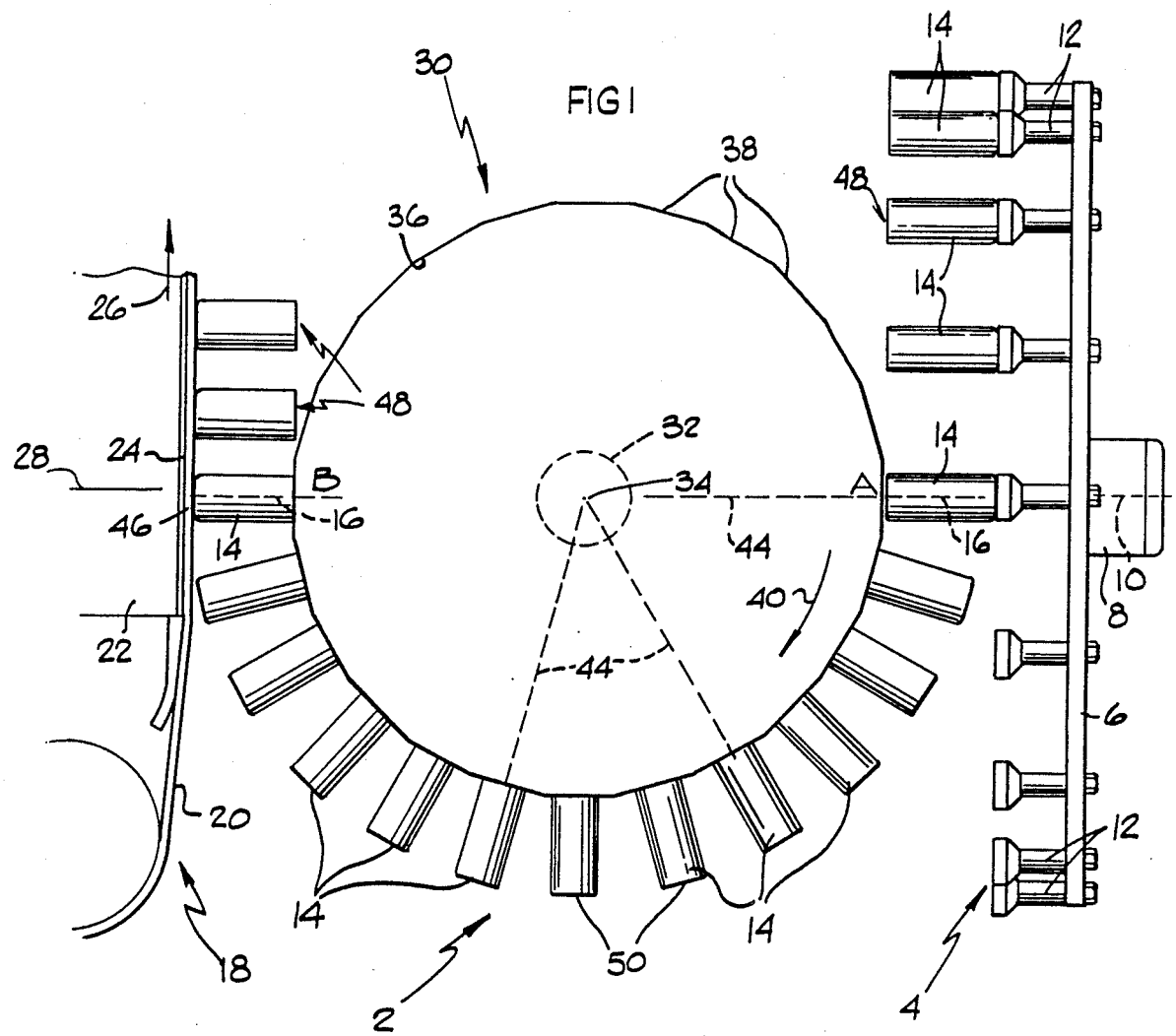
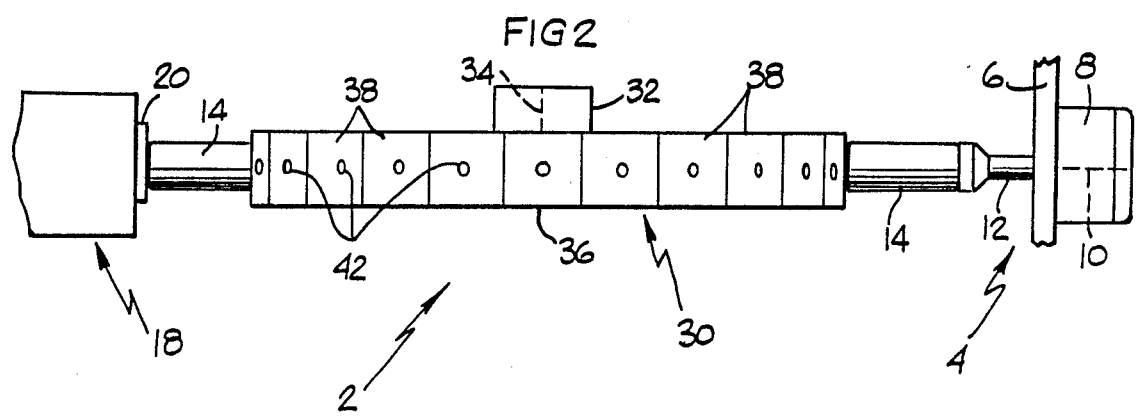

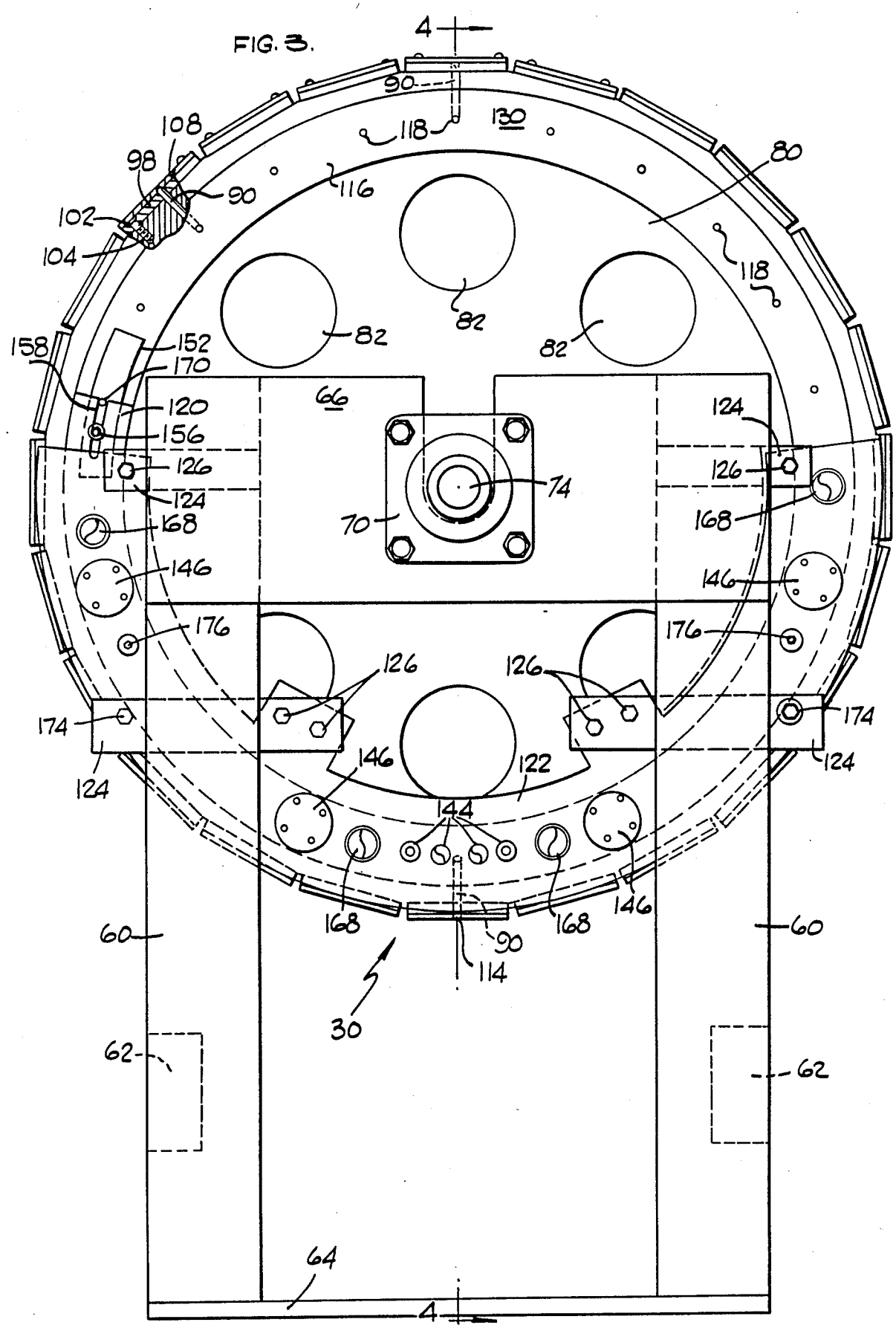

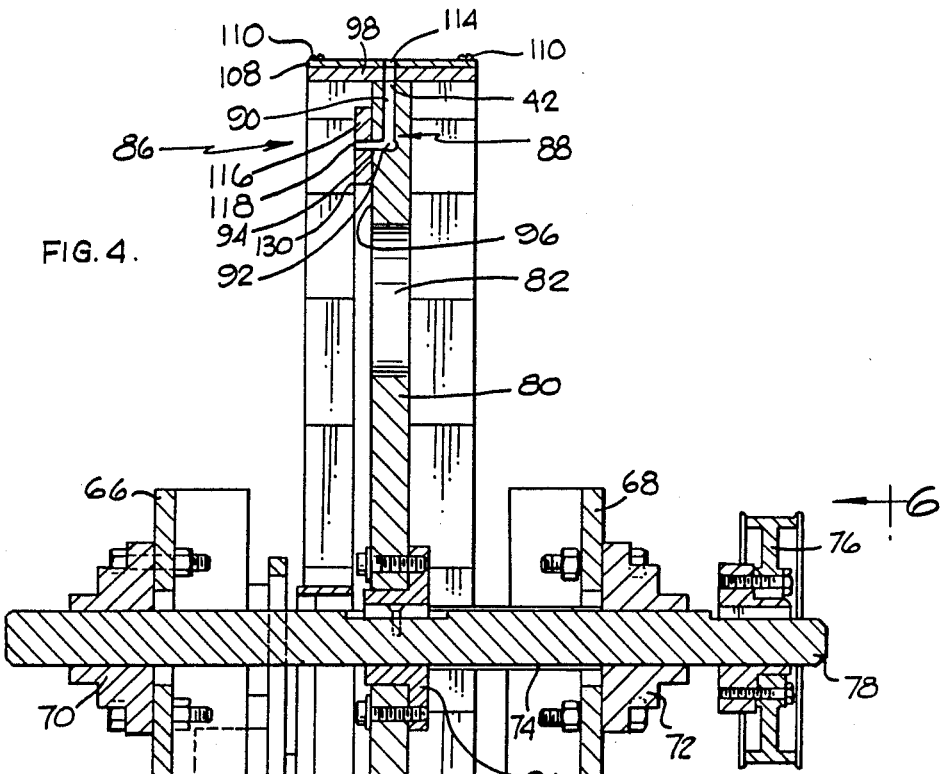
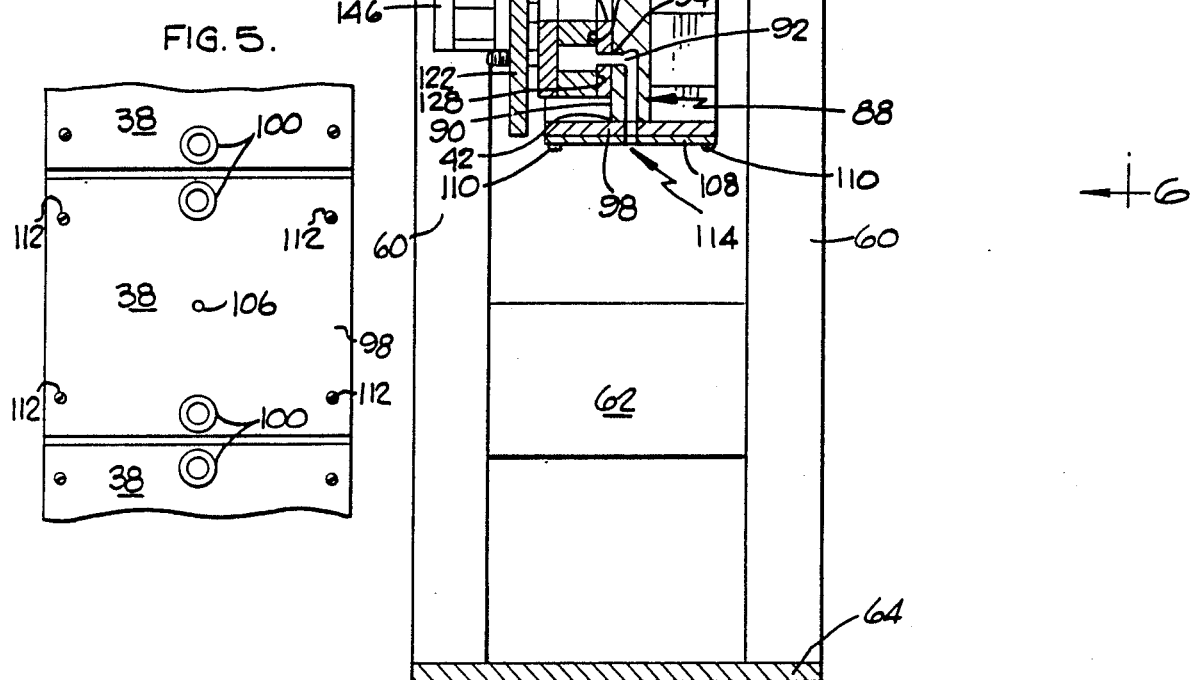
FIG. 4.
FIG. 5.

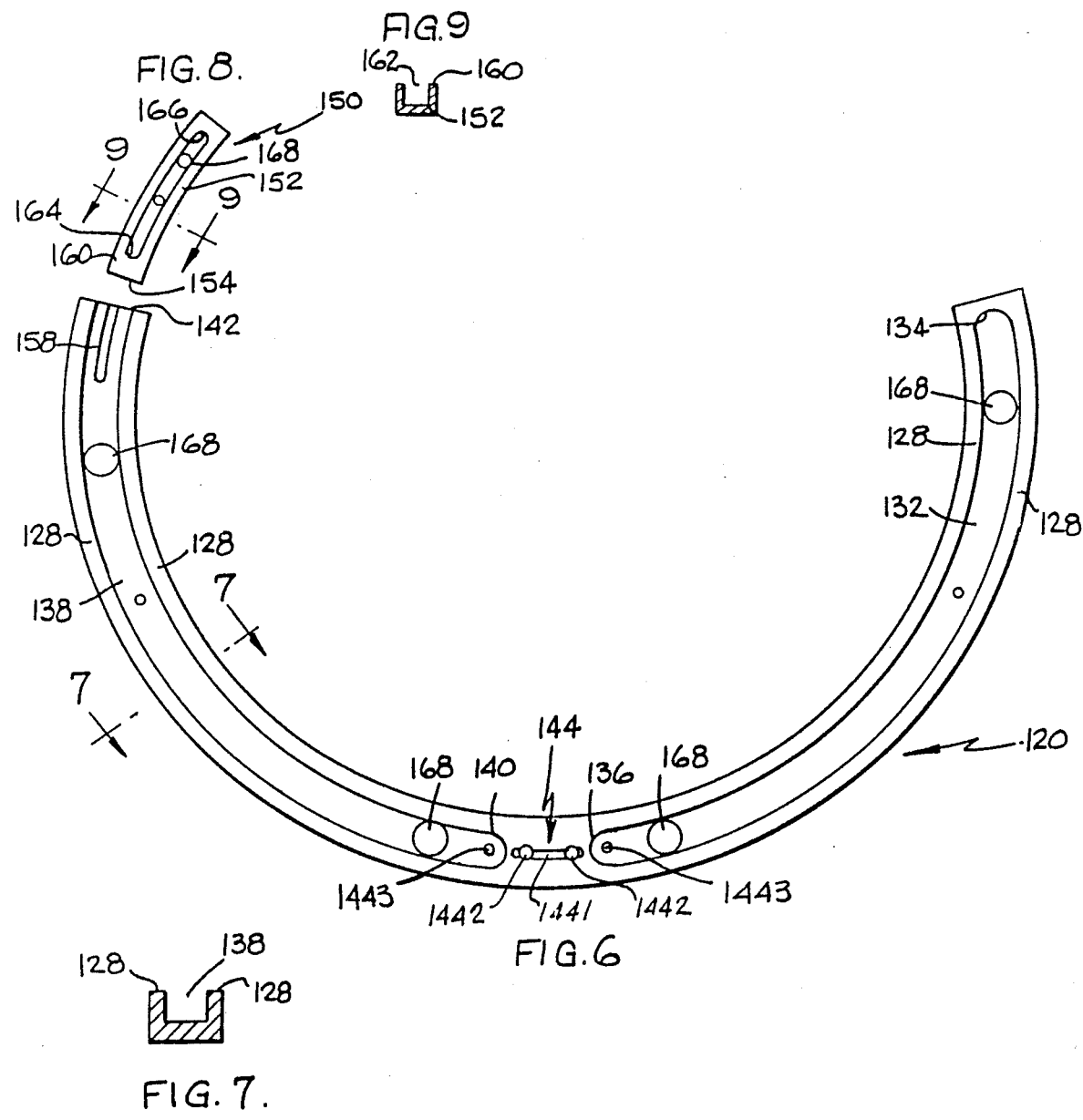

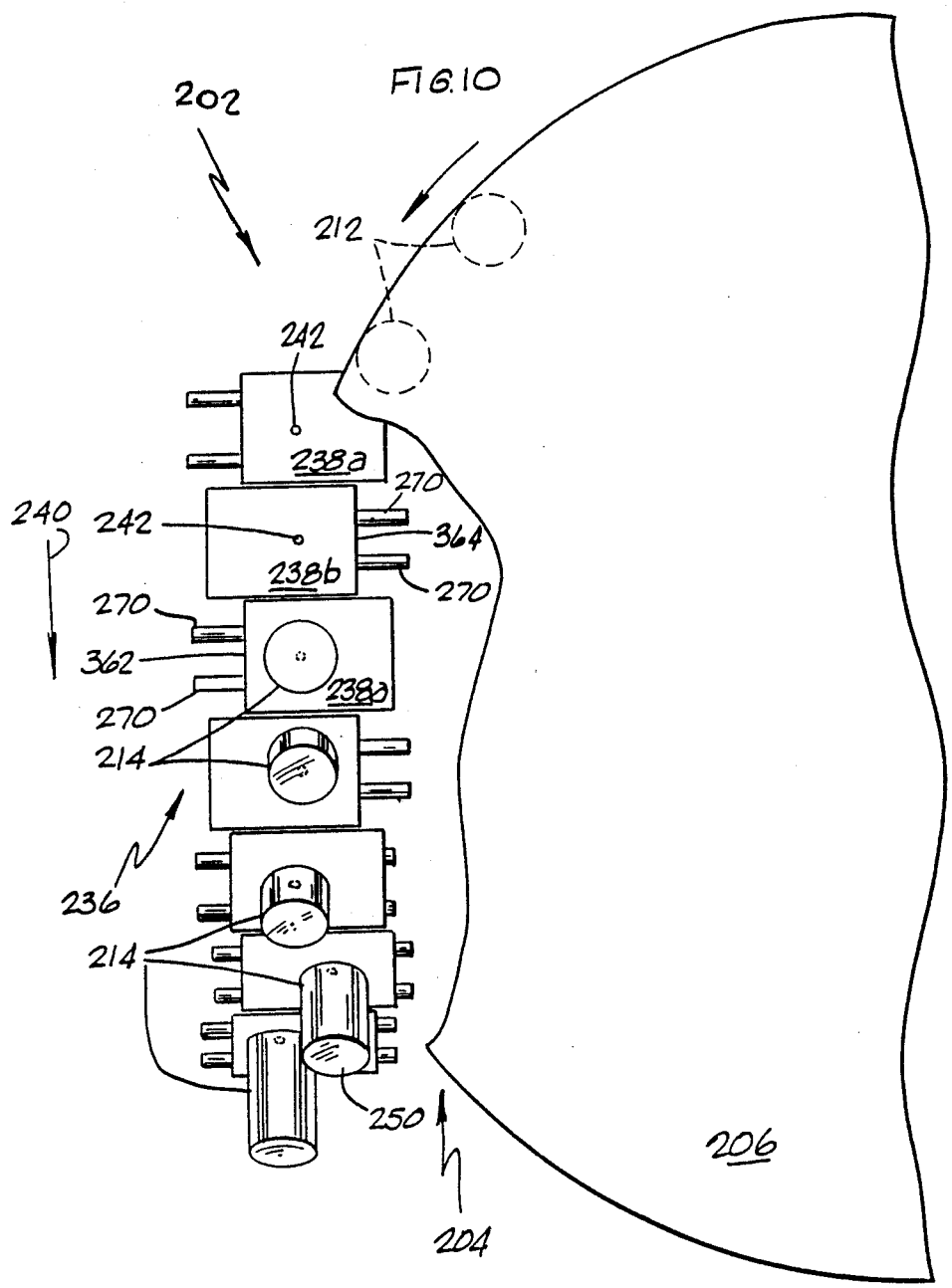

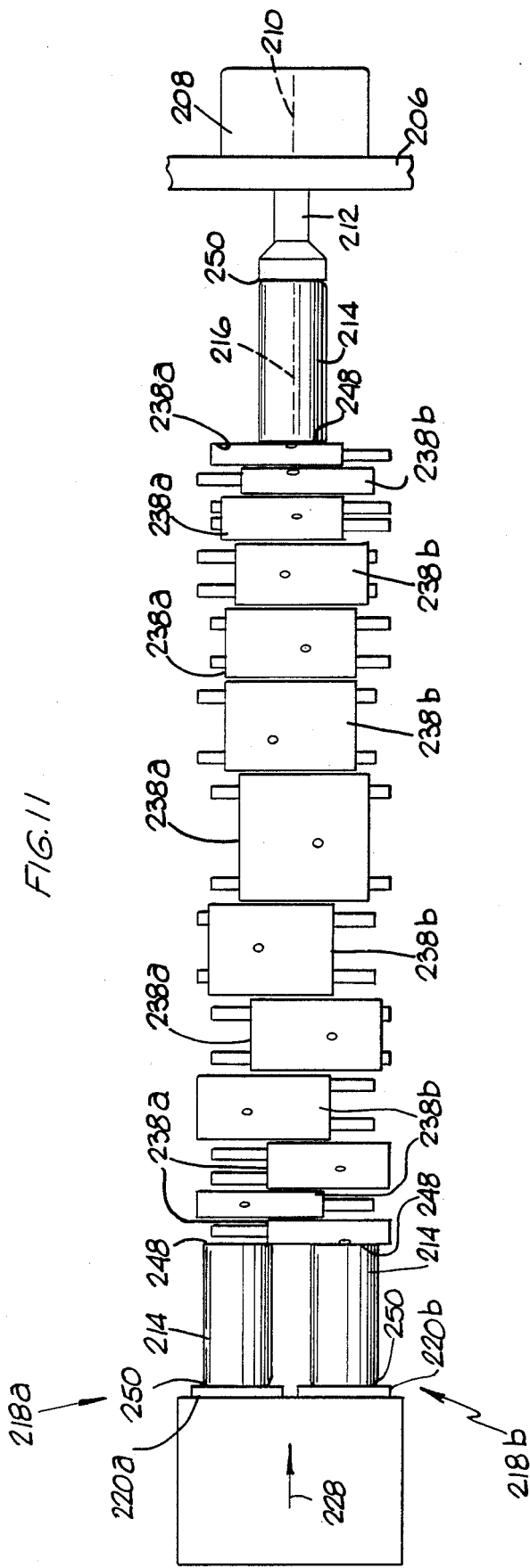

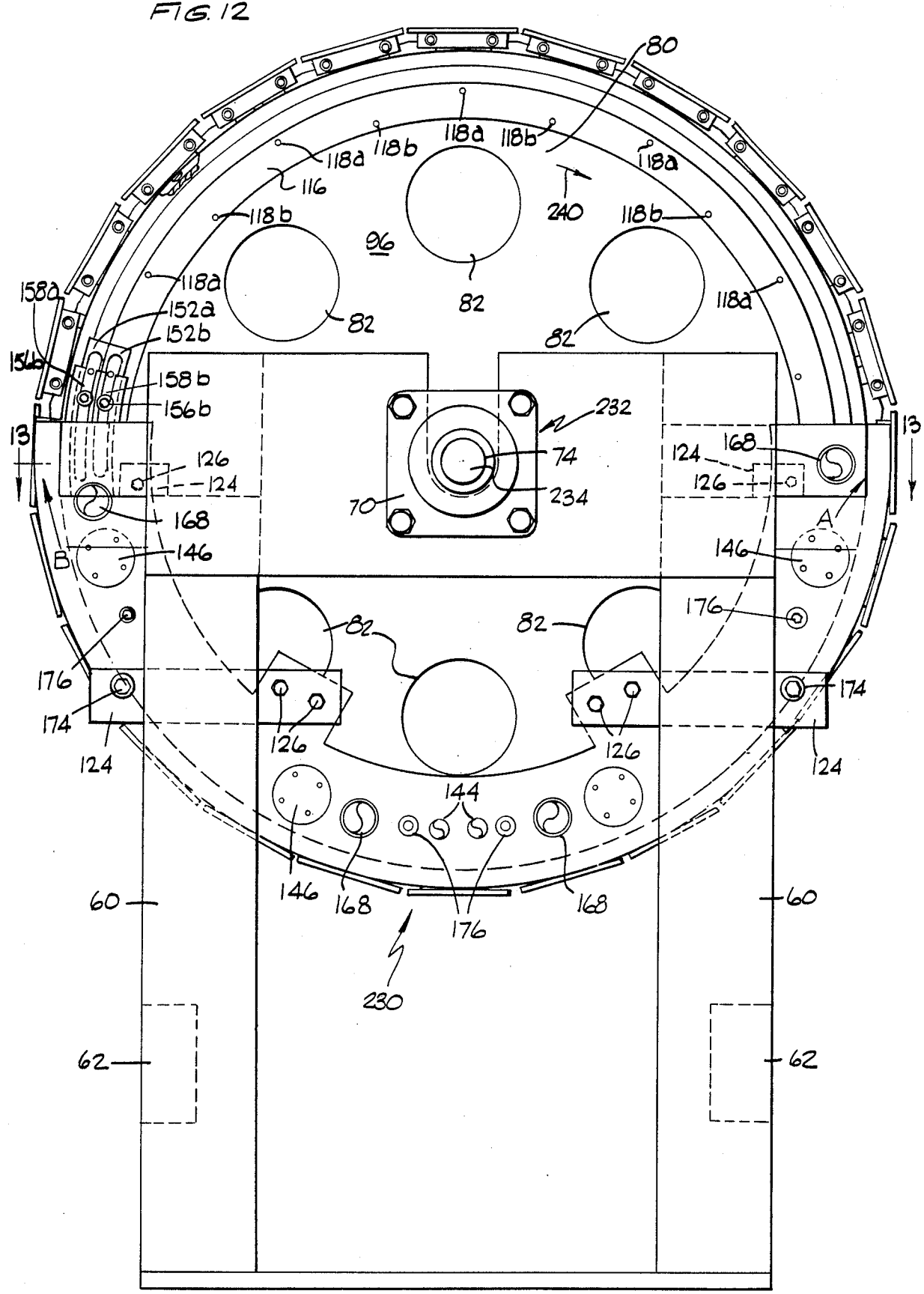

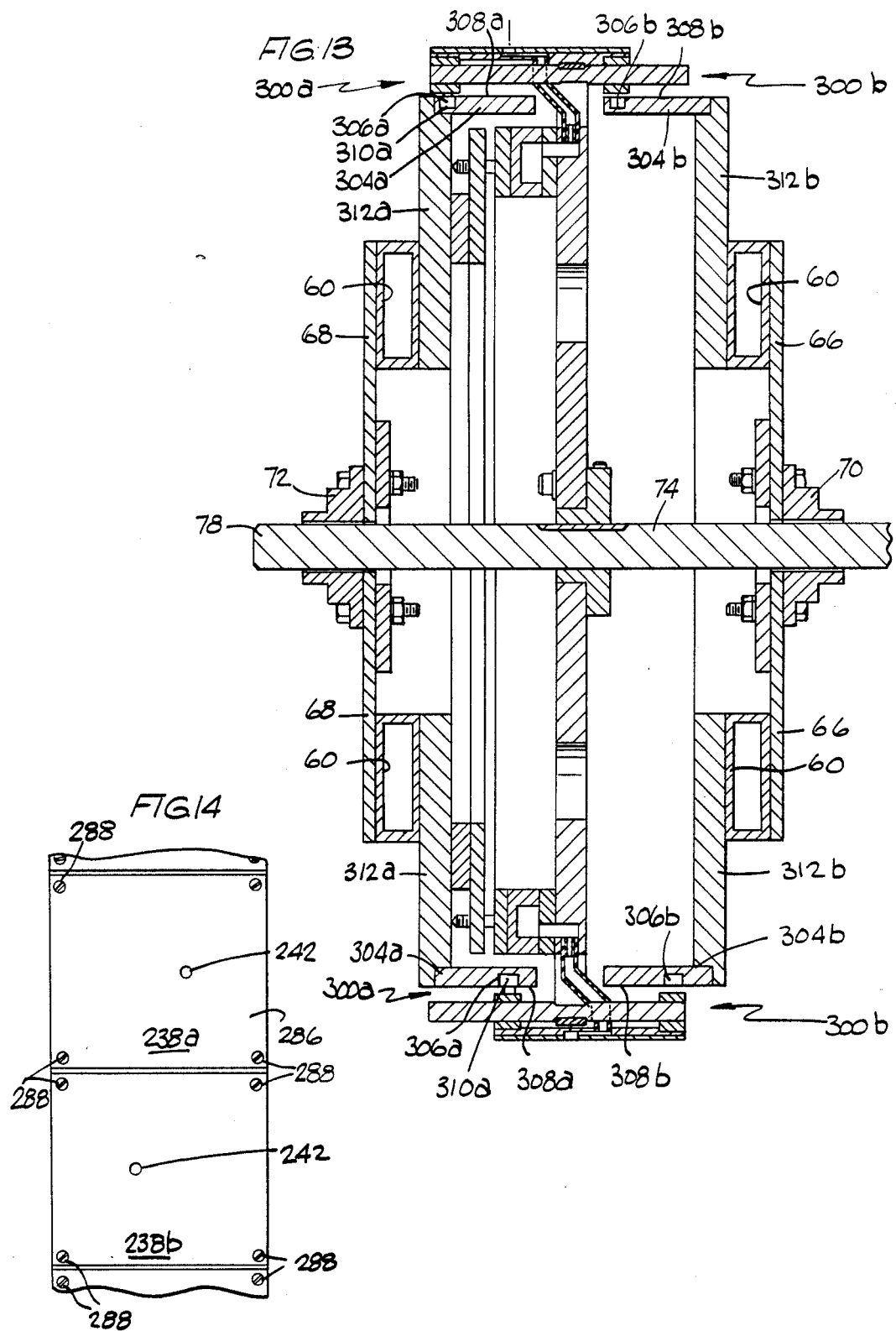

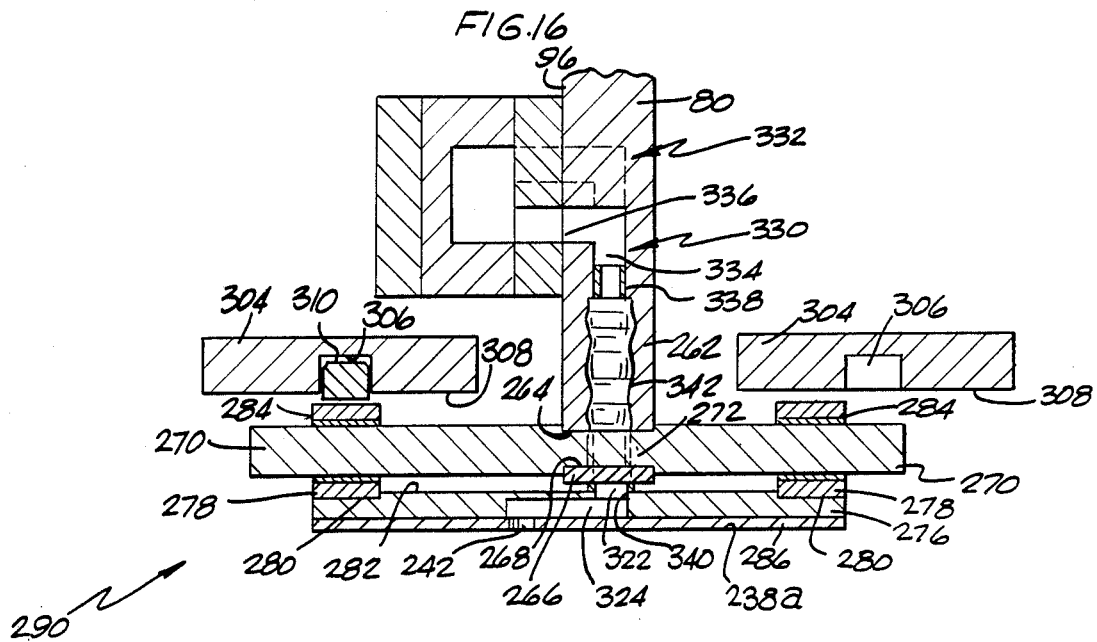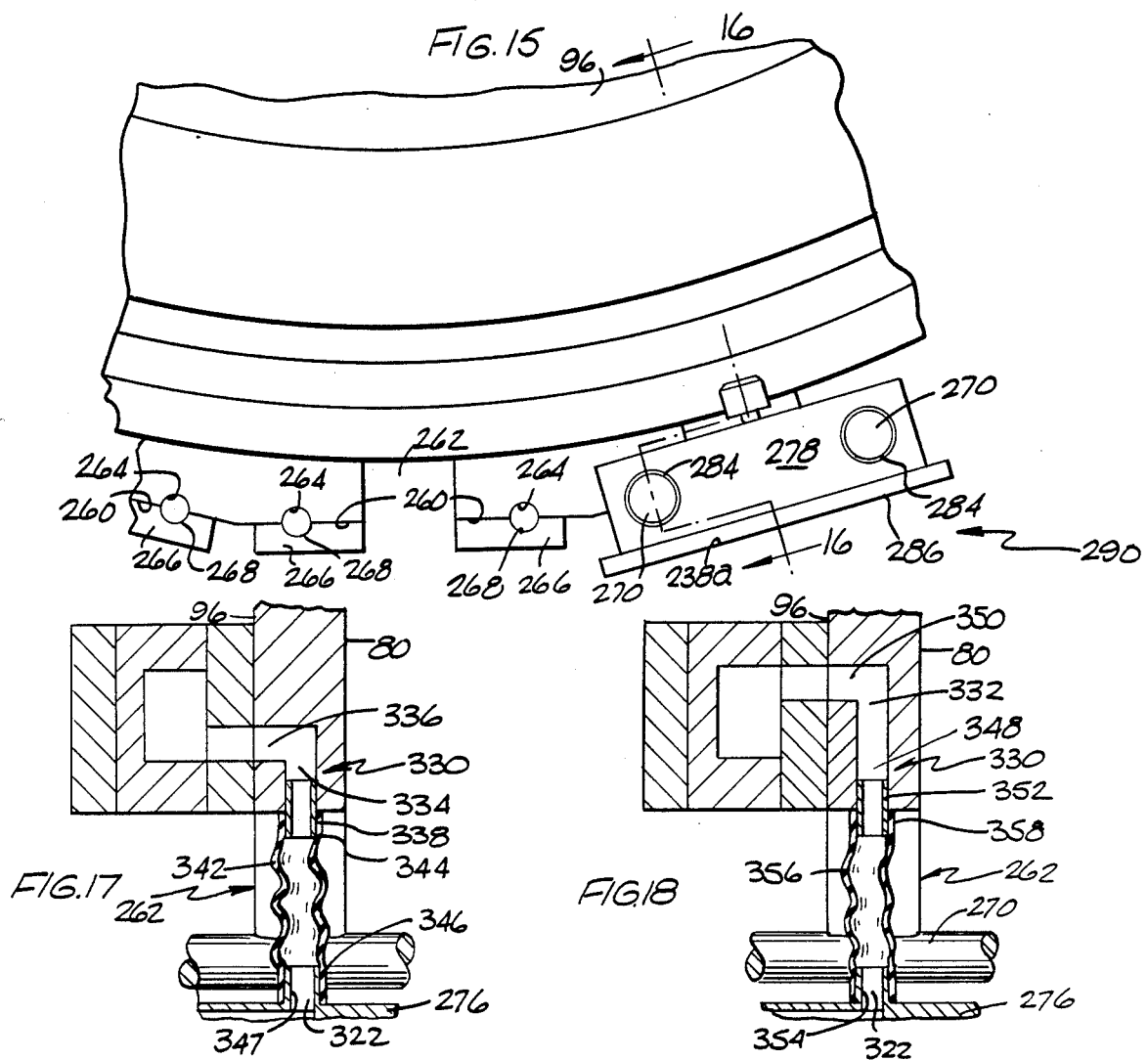

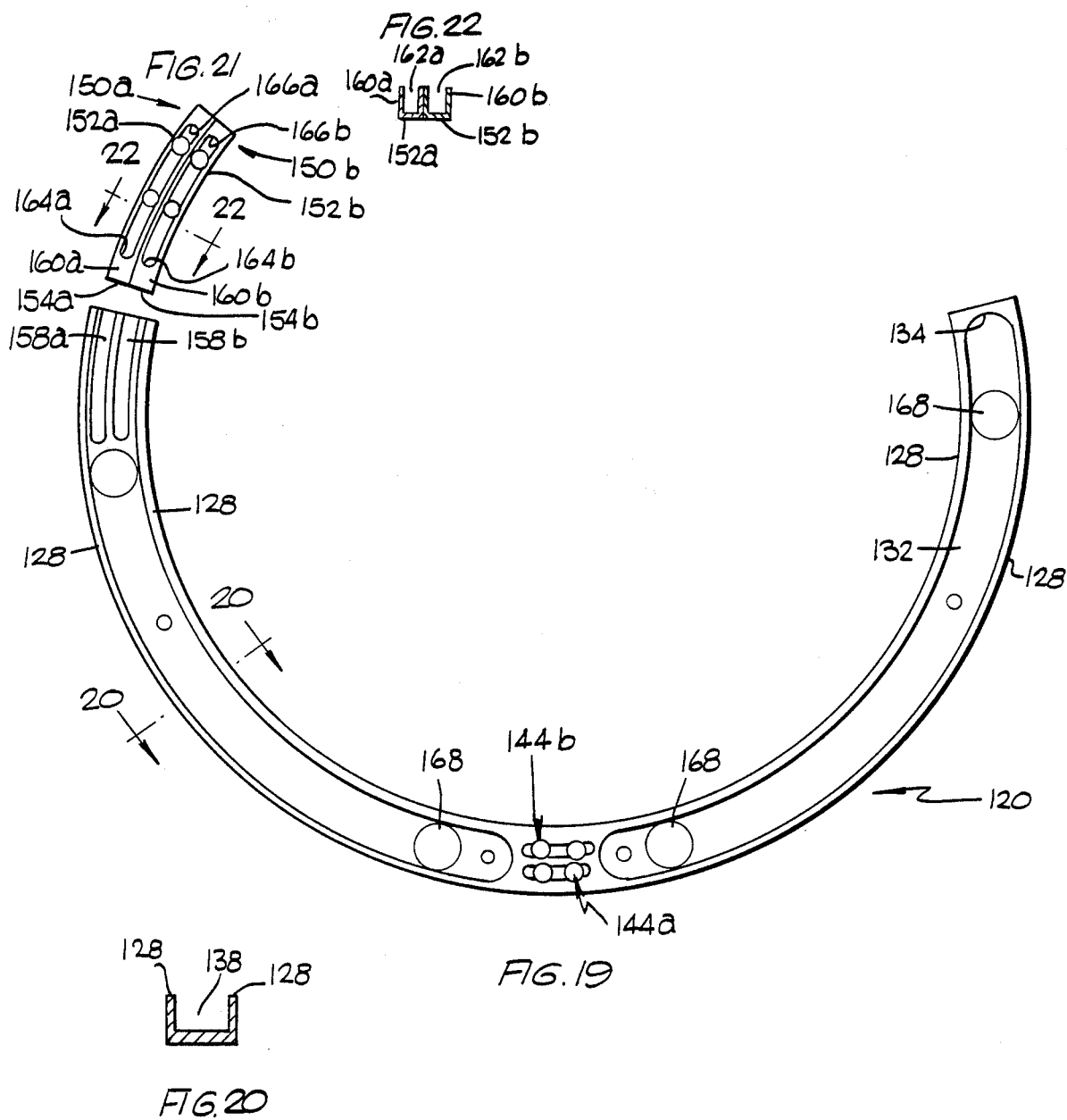

4,942,955

CONTAINER TRANSFER SYSTEM

This application is a continuation-in-part of U.S. Patent Application Ser. No. 069,397 filed July 1, 1987, now U.S. Pat. No. 4,771,879.

FIELD OF THE INVENTION

The present invention generally relates to the container manufacturing art and, more particularly, container conveyor and transfer apparatus used in connection with the decoration or coating of containers such as can body members.

BACKGROUND OF THE INVENTION

At the present time, containers of the can body member type, sometimes also referred to as cans, are conventionally decorated or coated by continuously moving decorator apparatus, sometimes also referred to as printing or printer or coater apparatus, which has a continuously rotatable container carrying mandrel wheel with circumferentially spaced container carrying mandrel devices for carrying undecorated containers along a first arcuate path of movement from a loading station to a transfer station, with circumjacent ink applying devices being associated with the container along the path of movement thereof to apply ink images onto the outer peripheral container surfaces. Such can body members have a cylindrical side wall portion, a closed bottom end wall portion, and an open rim end portion. The decorated containers are conventionally transferred from the rotatable mandrel wheel to circumferentially spaced support devices on a continuously rotatable container transfer wheel which carries the decorated containers away from the rotatable mandrel wheel along a second arcuate path. The decorated containers are then conventionally directly transferred from the rotatable transfer wheel to longitudinally spaced support pins on a continuously moving container conveyor chain, sometimes referred to as a deco chain, by which the decorated containers are carried to and through an ink curing and drying oven. Because of the numerous parts of the deco chain, there is a tendency for them to wear out and break down when operated at high speeds of 1,200 - 1,400 containers per minute in a continuous operation. In U.S. Pat. No. 4,445,431 to Stirbis, which is incorporated herein by reference thereto, there is disclosed a disk transfer system used as part of a can decorating or coating system. In U.S. Pat. No. 4,565,713 to Schultz, which is incorporated herein by reference thereto, there is disclosed a vacuum belt system for use in removing containers from the deco chain and carrying them through an ultraviolet radiation curing oven. The advantages resulting from the inventions in these patents were not completely realized for there still existed problems in transferring the containers from the vacuum disk transfer in the Stirbis patent to the vacuum belt in the Schultz patent. Also, when operated at the foregoing high speeds, there may not be sufficient time to cure the ink on the decorated can.

BRIEF DESCRIPTION OF THE INVENTION

This invention provides a container transfer system that transfers containers between a first container carrying apparatus, such as the continuously moving rotatable wheel type apparatus illustrated in the Stirbis patent, and second and third container carrying apparatus, each of which is a continuously moving vacuum belt conveyor leading to a curing oven as illustrated in the Schultz patent, using a continuously moving rotatable transfer wheel means.

In a preferred embodiment of the invention, a continuously rotating container transfer wheel means is mounted between a first container carrying wheel means and second and third continuously moving container carrying means and functions to transfer decorated containers having images of wet ink on the outer peripheries thereof from the first container carrying wheel means to the second and third continuously moving container carrying means for passage through a pair of ultraviolet curing means. The first container carrying wheel means has a fixedly located axis of rotation and carries the containers so that the longitudinal axis of each container is parallel to the axis of rotation. The continuously rotating transfer wheel means has a fixedly located axis of rotation that is perpendicular to the axis of rotation of the first container carrying wheel means and has a periphery comprising a plurality of spaced apart container carrying means, such as a plurality of rectangular pads, wherein each of the pads has connecting means for connecting each pad to a vacuum source so that the containers transferred to the transfer wheel means move with the continuously rotating transfer wheel means in a circular path. The plurality of pads are successively numbered as odd and even numbered pads. Moving means are provided to move the odd numbered pads in a linear path in one direction and to move the even numbered pads in a linear path in an opposite direction until the containers on the transfer wheel means are moving in two parallel spaced apart circular paths. The continuously rotating transfer wheel means is located relative to the first container carrying wheel means so that each of the pads moves into and out of a juxtaposed relationship with one end of a container being carried by the first container carrying wheel means and wherein the longitudinal axis of such container is in alignment with a radius of the transfer wheel means. A manifold means is mounted for operational relationship with the transfer wheel means and is connected to a suitable vacuum source. The beginning of the manifold means is located so as to apply the vacuum source to each pad when in the juxtaposed relationship to transfer the container from the first container carrying wheel means to the transfer wheel means. Continuously moving second and third container carrying means are provided and each of which comprises a vacuum belt means, having at least one portion thereof moving in a linear direction and which one portion has a transverse axis which is perpendicular to the linear direction of movement. The transfer wheel means is located relative to the at least one portions of the second and third container carrying means so that each of the pads moves into a juxtaposed relationship with at least a segment of the at least one portions wherein the longitudinal axis of the container being carried by the pad is in a parallel relationship with the transverse axis of either the second or third container carrying means. The ending of the manifold means is located so that the application of the vacuum source to the pad is ended when the pad is in the juxtaposed relationship with the segment so that the container is transferred from the transfer wheel means to the second or third container carrying means.

BRIEF DESCRIPTION OF THE DRAWINGS

An illustrative and presently preferred embodiment of the invention is shown in the accompanying drawing in which:

FIG. 1 is a schematic illustration of a container transfer system of this invention;

FIG. 2 is a top plan view of FIG. 1;

FIG. 3 is a front elevational view of a transfer wheel means;

FIG. 4 is a cross-sectional view taken on the line 4—4 of FIG. 3;

FIG. 5 is a top plan view of portions of the mounting plates;

FIG. 6 is an elevational view of the manifold means and is a mirror image of the inner side of that portion of FIG. 3;

FIG. 7 is a cross-sectional view taken on the line 7—7 of FIG. 6;

FIG. 8 is an elevational view of the vacuum cut-off adjusting means and is a mirror image of the inner side of that portion of FIG. 3;

FIG. 9 is a cross-sectional view taken on the line 9—9 of FIG. 8;

FIG. 10 is a schematic illustration of a portion of this invention;

FIG. 11 is a schematic illustration of the preferred embodiment of this invention;

FIG. 12 is a front elevational view of the transfer wheel means of FIG. 11;

FIG. 13 is a cross-sectional view taken on the line 13—13 of FIG. 12;

FIG. 14 is a top plan view illustrating the mounting of the vacuum pads;

FIG. 15 is a side elevational view of portion of the lower half of the transfer wheel means of FIG. 12;

FIG. 16 is a cross-sectional view taken on the line 16—16 of FIG. 15;

FIG. 17 is a partial view in cross-section illustrating the vacuum connection between an odd numbered pad and the manifold means;

FIG. 18 is a partial view in cross-section illustrating the vacuum connection between an even numbered pad and the manifold means;

FIG. 19 is an elevational view of the manifold means and is a mirror image of the inner side of that portion of FIG. 12;

FIG. 20, is a cross-sectional view taken on the line 20—20 of FIG. 19;

FIG. 21 is an elevational view of the vacuum cut-off adjusting means and is a mirror image of that portion of FIG. 12; and FIG. 22 is a cross-sectional view taken on the line 20—20 of FIG. 21.

DETAILED DESCRIPTION OF THE INVENTION

In FIGS. 1 and 2, there is illustrated a container transfer system 2 comprising a first container carrying on apparatus 4, of the type illustrated in the Stirbis patent, comprising a continuously rotating mandrel wheel means 6 having mounting means B to provide a fixed axis of rotation 10 therefor. A plurality of spaced apart container carrying vacuum cup devices on mandrels 12 project outwardly from the wheel means 6 and are connected to a vacuum source (not shown) so that during a portion of the rotation of th mandrel wheel means 6, each container carrying mandrel 12 carries a decorated container 14, having images of wet ink on the periphery thereof, so that the longitudinal axis 16 of each container 14 on each container carrying mandrel 12 is parallel to the axis of rotation 10. A second container carrying apparatus 18, of the type illustrated in the Schultz patent, comprises a continuously moving conveyor belt means 20 passing over a vacuum source 22 and wherein the conveyor belt means 20 is constructed so that when it passes over the vacuum source 22, it will hold any container 14 positioned thereon for movement therewith. At least a portion 24 of the conveyor belt means 20 moves in a linear direction, as indicated by the arrow 26, as it passes over the vacuum source 22 and has a transverse axis as indicated by the arrow 28. The longitudinal axis 16 of each container 14 carried on the conveyor belt means 20 is parallel to the transverse axis 28.

A transfer wheel means 30 is mounted by mounting means 32 for continuous rotation about a fixed axis of rotation 34 which is perpendicular to the fixed axis of rotation 10. The transfer wheel means 30 has a peripheral surface 36 having a plurality of spaced apart generally planar surfaces 38, described more fully below, and is rotated in the direction indicated by the arrow 40. A central opening 42 in each of the planar surfaces 38 is connected to a vacuum source, described below, so that as the transfer wheel means 30 rotates from a location A to a location B, a container 14 will be carried by pads, attached to each planar surface 38, as described below, from location A to location B. Each central opening 42 lies on a radius 44 of the transfer wheel means 30. In operation, as the transfer wheel means 30 rotates, one of the planar surfaces will move into a juxtaposed relationship with one of the containers 14 on the first container carrying apparatus 4 adjacent to location A wherein the longitudinal axis 16 of the container 14 is in alignment with a radius 44 of the transfer wheel means 30. At this time, the vacuum being applied to the associated container carrying mandrel 12 is discontinued and a vacuum is applied to the associated planar surface 38 s that the container 14 will be transferred from the first container carrying apparatus 4 to the transfer wheel means 30 for movement therewith. As the transfer wheel means 30 continues to rotate, a planar surface 38 carrying a container 14 will move into a juxtaposed relationship with a segment 46 of the at least a portion 24 of the conveyor belt 20 means adjacent to the location B wherein the longitudinal axis 16 of the container 14 is parallel to the transverse axis 28. At this time, the vacuum being applied to the associated planar surface 38 is discontinued and a vacuum is applied to the segment 46 s that the container 14 will be transferred from the transfer wheel means 30 to the conveyor belt means 20 for movement through a curing oven as described in the Schultz patent. As illustrated in FIG. 1, each container 14 carried by the first container carrying apparatus 4 has its open end 48 exposed; each container 14 carried by the transfer wheel means 30 has its closed end 50 exposed and each container 14 carried by the conveyor belt means 20 has its open end 48 exposed. Thus, the closed bottom end portions of the containers are supportively engaged by vacuum cup devices 12 and belt 20 while the open rim end portions are supported on planar surfaces 38 of transfer wheel means 30.

The transfer wheel means 30 is illustrated more specifically in FIGS. 3 and 4 and comprises a plurality of supporting members 60 joined together by a plurality of beams 62 and positioned on a fixed base 64. A first bearing support plate 66 is secured to two of the supporting members 60 adjacent to the top portions thereof and a second bearing support plate 68 is secured to an opposite two of the supporting members 60 adjacent to the top portions thereof. A first bearing block 70 is secured to the first bearing support plate 66 and a second bearing block 72 is secured to the second bearing support plate 68. A shaft means 74 is rotatably mounted in the bearing blocks 70 and 72. A drive mechanism 76 is secured to one end 78 of the shaft means 74 and is connected to a suitable drive means (not shown), such as a conventional drive chain, to rotate the drive mechanism 76 and therefore the shaft means 74.

A one piece annular disk member 80, which is preferably made of machined aluminum plate or cast material. The disk member 80 has a plurality of cut-out portions 82 to reduce the weight thereof. A hub 84 is secured to the disk member 80 and to the shaft means 74 so that the hub 84 and the disk member 80 rotate with the shaft means 74. Connecting means 86 are provided for connecting the central opening 42 in each planar surface 38 to a vacuum source and includes an L-shaped passageway 88 with the long leg 90 ending at the central opening 42. The short leg 92 has a opening 94 in the front surface 96 of the disk member 80. A rectangular plate 98 is secured to each planar surface by conventional means such as chamfered holes 100 and threaded bolts 102 secured in threaded openings 104. A central opening is formed in each rectangular plate 98 and is aligned with a central opening 42. A rectangular pad 108 is mounted on each rectangular plate 98 by threaded bolts having heads 110 secured in threaded openings 112 in each rectangular plate 98. A central opening 114 is formed in each of the rectangular pads 108 and is aligned with the central openings 42 and 106. An annular manifold ring 116 is secured to the front surface 96 of the disk member 80 and has a plurality of openings 118, each of which is in alignment with the opening 94 in each short leg 92.

A manifold means 120 is secured to a manifold carrier 122 which is secured to frame members 124 by bolts 126. The manifold means 120 is arcuately shaped and extends through an arc of about 210 degrees. The manifold means 120, as illustrated in FIG. 6, has a smooth planar inner surface 128 which is mounted so as to be in surface-to-surface contact with a smooth planar surface 130 of the manifold ring 116, as described below. A first arcuate groove 132 is formed in the inner surface 128 and has a first closed end 134 which functions as the manifold beginning means and a second closed end 136. A second arcuate groove 138 is formed in the inner surface 128 and has a closed end 140 and an open end 142. A conventional defective can discharge means 144 is located between the second closed end 136 and the closed end 140. The slot 1441 in the defective can discharge means 144 is connected to the groove 132 by tube 1442 so that a vacuum is applied to a container as it passes over the slot. When a defective can is detected, a jet of air is issued from the jet 1443 to negate the vacuum and supply a force so that the defective can drops off the pad 108. The manifold means 120 is secured to the manifold carrier 122 by conventional air cylinder mounting means 146 so that the inner surface 128 of the manifold means 120 is resiliently urged against the smooth planar surface 130 of the manifold ring 116.

In FIGS. 8 and 9, there is illustrated adjustment means 150 for closing the open end 142 of the second arcuate groove 138 and which functions to provide the manifold ending means. The adjustment means 150 comprises a solid arcuately shaped member 152 dimensioned so that it may have closely fitting sliding movement in the second arcuate groove 138. The arcuately shaped member 152 has a solid end portion 154 which functions as the manifold ending means. A thumb screw 156 extends outwardly from the arcuately shaped member 152 and passes through the arcuately shaped slot 158 of the manifold means 120 and locks the adjustable means 150 in any desired position by clamping the portions of the manifold means 150 adjacent to the arcuately shaped slot 158 between the head of the thumb screw 156 and the surface of the arcuately shaped member 152 so that the manifold ending means of the manifold means 120 may be adjusted. The inner surface 160 has an arcuately shaped groove 162 formed therein having closed ends 164 and 166. A threaded opening 168 extends through the arcuately shaped member 152 and opens into the arcuately shaped groove 162. A fitting 170 is connected to a suitable source of pressurized air (not shown) and functions to provide puff of air through the L-shaped passageway 88 to ensure that the container is transferred from the transfer wheel means 30 to the second container carrying apparatus 18.

The radius of the centerlines of the arcuately shaped grooves 132, 138 and 162 is the same as the radius to the center of each opening 118. The transfer wheel means 30 and the manifold means 120 are mounted so that, as the annular disk member 80 rotates, each of the openings 118 passes over the arcuately shaped grooves 132 and 138 so as to have a suction applied thereto and over the arcuately shaped groove 162 to have a puff of air applied thereto. There are four vacuum ports 168 connected to a suitable vacuum source (not shown), but the number of vacuum ports can vary. Also, conventional jacking screws 174 bear against the manifold carrier 122 for adjusting the manifold means 120. Conventional shoulder screws 176 are mounted on the manifold means 120 and float in openings in the manifold carrier 122 to prevent rotation of the manifold means 120.

In operation, containers 14 are carried by the container carrying mandrels 12 so that the longitudinal axis of each container 14 is parallel to the axis of rotation 10 and the open ends 48 thereof are exposed. When a container 14 reaches location A with the longitudinal axis 16 of a container 14 aligned with a radius of the transfer wheel means 30, the suction being applied to the associated container carrying mandrel 12 is discontinued and suction is applied to a pad 108 which is in juxtaposed relationship to the open end 48 of the container 14 so that the container 14 is transferred from the first container carrying apparatus 4 to the transfer wheel means 30 with the closed end 50 of each container 14 exposed. The mandrel wheel means 6 and the transfer wheel means 30 are rotated so that the pad 108 and the open end 48 of the container 14 being transferred are moving at about the same speed when the container is transferred from the first container carrying apparatus 4 to the transfer wheel means 30. Each container 14 then moves with the pad 108 until it reaches location B with the longitudinal axis 16 thereof in parallel relationship with the transverse axis 28. The suction being applied to the pad 108 is discontinued and the suction being applied through the conveyor belt 20 causes the container 14 to be transferred from the transfer wheel means 30 to the second container carrying apparatus 18 with the open end 48 of each container exposed for the proper curing thereof. The speed of the second container carrying means 18 is slower than the speed of the transfer wheel means 30 at location B. In one embodiment of the invention, the speed of the second container carrying means 18 is two-thirds of the speed of the transfer wheel means 30 so that the containers 14 are located on the second container carrying means 18 with the centers thereof are spaced apart a distance of about 3.5 inches. The second container carrying apparatus 18 has its own driving means so it can move the containers thereon through the curing oven even if there is a break down in prior portions of the decorating system. This means that the ultra violet lights do not have to be adjusted. Also, the second container carrying apparatus 18 can be run at a slower speed for a more efficient operation. The arcuately shaped member 152 is originally positioned at a predetermined operational position. If the containers are not being transferred properly, the arcuately shaped member 152 can be adjusted while the transfer wheel means 30 is operating until proper operation is obtained.

In one use of the embodiment illustrated in FIGS. 2–9, the transfer wheel means 30 has a radius to the open end of the central opening 114 of about 15.125 inches. Twenty-four rectangular pads 108 are mounted on the annular disk member 80. The radius to the center of each opening 118 is about 13 inches which is the same as the radius to the centerline of the arcuate grooves 132, 138 and 162. The arcuate grooves 132 and 138 each have a radial extent of about 1.00 inch and have a depth of about 0.75 inch. The arcuate groove 162 has a radial extent of about 0.5 inch and a depth of about 0.5 inch. The transfer wheel means 30 is rotated at a speed of about 58.3 rpm so as to transfer about 1,400 containers per minute from the first container carrying apparatus to the second container apparatus. This rate of container transfer is illustrative only since containers may be transferred at rates in excess of 1,600 containers per minute.

In FIGS. 10–20, there is illustrated the preferred embodiment of the invention comprising a container transfer system 202 having a first container carrying means 204 comprising a continuously rotating mandrel wheel means 206 having mounting means 208 to provide a fixed axis of rotation 210 therefor. A plurality of spaced apart container carrying mandrels 212 project outwardly from the wheel means 206 and which mandrels are connected to a vacuum source (not shown) so that during a portion of the rotation of the mandrel wheel means 206, each container carrying mandrel 212 carries a decorated container 214, having images of wet ink on the periphery thereof, so that the longitudinal axis 216 of each container 214 on each container carrying mandrel 212 is parallel to the axis of rotation 210. Second and third container carrying means 218a and 218b comprise a continuously moving conveyor belt means 220a and 220b, each of which is similar to that described above in relation to FIG. 1 and passes over a vacuum source 22 and wherein the conveyor belt means 220a and 220b are constructed so that when each of them passes over the vacuum source 22, it will hold any container 214 positioned thereon for movement therewith. Also, each conveyor belt means 220a and 220b has at least a portion 24 thereof that moves in a linear direction, as it passes over the vacuum source 22 and has a transverse axis as indicated by the arrow 228. The longitudinal axis 216 of each container 214 carried on the conveyor belt means 220a and 220b is parallel to the transverse axis 228.

A transfer wheel means 230, FIG. 12, is mounted by mounting means 232 for continuous rotation about a fixed axis of rotation 234 which is perpendicular to the fixed axis of rotation 210. The transfer wheel means 230 has a peripheral surface 236 having a plurality of spaced apart generally planar surfaces 238a and 238b, described more fully below, and is rotated in the direction indicated by the arrow 240. An opening 242 in each of the planar surfaces 238a and 238b is connected to a vacuum source, described below, so that as the transfer wheel means 230 rotates from a location A to a location B, a container 214 will be carried by pads, attached to each planar surface 238a and 238b as described below, from location A to location B. Each central opening 242 lies on a radius of the longitudinal axis 234 of the transfer wheel means 230. In operation, as the transfer wheel means 230 rotates, one of the planar surfaces 238a or 238b will move into a juxtaposed relationship with one of the containers 214 on the first container carrying wheel means 204 adjacent to location A wherein the longitudinal axis 216 of the container 214 is in alignment with a radius of the transfer wheel means 230. At this time, the vacuum being applied to the associated container carrying mandrel 212 is discontinued and a vacuum is applied to the associated planar surface 238a or 238b so that the container 214 will be transferred from the first container carrying wheel means 204 to the transfer wheel means 230 for movement therewith. As the transfer wheel means 230 continues to rotate, a planar surface 238a carrying a container 214 will move in one linear direction, as explained below, parallel to the longitudinal axis 234 and a planar surface 238b will move in an opposite linear direction so that the containers 214 carried by the planar surfaces 238a and 238b are moved into two parallel spaced apart circular paths. When a container 214 on either of the planar surfaces 238a or 238b moves into a juxtaposed relationship with a segment 46 of the conveyor belt means 220a or 220b adjacent to the location B wherein the longitudinal axis 216 of the container 214 is parallel to the transverse axis 228, the vacuum being applied to the associated planar surface 238a or 238b is discontinued and a vacuum is applied to the segment 46 so that the container 214 will be transferred from the transfer wheel means 230 to the conveyor belt means 220a or 220b for movement through a curing oven (not shown). As illustrated in FIGS. 10 and 11, each container 214 carried by the first container carrying means 204 has its open end 248 exposed; each container 214 carried by the transfer wheel means 230 has its closed end 250 exposed and each container 214 carried by the conveyor belt means 220a or 220b has its open end 248 exposed.

The transfer wheel means is supported and driven by the same means as described above in relation to FIGS. 3 and 4 so that the corresponding parts in FIGS. 12 and 13 have been given the same reference numerals.

The apparatus for mounting and moving the planar surfaces 238a and 238b is illustrated in FIGS. 13, 15 and 16. The peripheral surface of the annular disk member 80 comprises a plurality of successive flat planar surfaces 260. A portion of the annular disk member 80 is cut away to form a groove 262 extending radially inwardly from each flat planar surface 260. Two spaced apart semi-circular openings 264 are formed in each of the flat planar surfaces 260. A clamping plate 266, each of which has a semi-circular opening 268 therein, is secured on the flat planar surfaces 260 by suitable means such as threaded bolts (not shown), so that the semi-circular openings 264 and 268 will form two spaced apart circular openings.

As illustrated particularly in FIG. 16, shaft means 270 having a generally circular cross-sectional configuration has a non-central portion 272 having a diameter less than the diameter of the other portions of the shaft means 270. The non-central portion 272 is positioned in each of the semi-circular openings 264 and then the clamping plate 266 is secured to the flat planar surface 260 so that each shaft means 270 is clamped in an off-center fixed position. A generally rectangularly shaped support member 276 is provided and has two spaced apart bearing blocks 278 secured in recesses 280 in the inner surface 282 thereof by suitable means such as threaded bolts (not shown). Two spaced apart bearings 284 are mounted in each of the bearing blocks 278. A generally rectangularly shaped pad 286 is secured to each support member 276 by a plurality of threaded bolts 288 (FIG. 14) received in threaded openings (not shown) in the support member 276. Each of the pads 286 provides one of the generally planar surfaces 238a or 238b. In the preferred embodiment of the invention, there are twenty-four pads 286 mounted on the annular disk 80 so that for purposes of illustration, the pads 286 with the planar surfaces 238a are identified as the odd number pads and the pads 286 with the planar surfaces 238b are identified as the even numbered pads. As illustrated in FIG. 16, the shafts 270 are mounted on each planar surface 260 so that they are off center in relation to the center line of the annular disk member 80 and each successive off-center mounting is alternated, as illustrated in FIG. 11. Thus, the shafts 270 for the odd numbered pads 286 and the planar surfaces 238a are off center in one direction from the centerline of the annular disk member 80 and the shafts 270 for the even numbered pads 286 and the planar surfaces 238b are off-center in the opposite direction. When assembled with the shafts 270 passing through the bearings 284, the bearing blocks 278, the support members 276 and the pad 286 constitute a slide assembly 290 that slides over the shafts 270 in linear directions.

The means for moving the slide assemblies 290 over the shafts 270 is illustrated in FIG. 13 and comprise a cam means 300a for the odd numbered pads 286 having planar surfaces 238a and cam means 300b for the even numbered pads 286 having planar surfaces 238b. Each of the cam means 300a and 300b comprise an annular member 304a or b having a cam groove 306a or b extending radially inwardly from the peripheral surface 308a or b thereof. A rotatable cam follower 310a or b is mounted on one of the bearing blocks 278 so that the cam follower 310a or b is located for movement in the cam groove 306a or b. As the cam follower 310a or b moves in the cam groove 306a or b, it follows the contours of the cam groove 306a or b to move the slide assemblies 290 over the shafts 270. This movement is illustrated in FIGS. 10 and 11 which show that the containers 214 are transferred from the first container carrying wheel means 204 to the planar surfaces 238a and 238b and they commence movement in one circular path. As the planar surfaces 238a and 238b are moved by the slide assemblies 290 in opposite directions, they move into two spaced apart circular paths to be transferred from the planar surfaces L 238a and 238b to the second or third container carrying means 218a and 218b. Support beams 312a or b are secured to the annular members 304a or b and the supporting members 60 so as to hold the annular members 304a or b in a fixed location.

As illustrated in FIGS. 14 and 16, each opening 242 extends through each pad 286 and is located in an off-center position. A second off-center opening 322 is formed in the inner surface 282 of the support member 276. A recess 324 is formed in the support member 276 so that, when a pad 286 is mounted on a support member 276, a passageway is formed to connect the first and second off-center openings 242 and 322.

When mounted for sliding movement over the shafts 270, the first off-center opening 242 is off-center from the centerline of a pad 286 in a circumferential direction in the same direction and the shafts 270 are off-center from the centerline in a circumferential direction of the annular disk member 80. Therefore, the shafts 270 are illustrated in FIG. 10 in their off-centered positions.

As illustrated in FIGS. 12, 16–18, the annular disk member 80 has a first plurality of L-shaped passageways 330 formed therein for the odd numbered pads 286 having the planar surfaces 238a and a second plurality of passageways 332 formed therein for the even numbered pads 286 having the planar surfaces 238b. As illustrated in FIG. 17, each of the L-shaped passageways 330 has a long leg 334 extending in a radial direction and a short leg 336 extending in an axial direction. Hollow tube 338 is secured in the long leg 334 and projects radially outwardly into the radially inwardly extending groove 262. The short leg 336 has an opening formed in the front surface 96 of the annular disk member 80. A hollow tube 340 is secured in the opening 322 and projects radially inwardly therefrom. A hollow flexible tube 342 has one end 344 thereof secured to the hollow tube 338 and the other end 346 thereof secured to the hollow tube 347 which is secured to the inner surface 282 surrounding the opening 322. As illustrated in FIG. 18, each of the L-shaped passageways 332 has a long leg 348 extending in a radial direction and a short leg 350 extending in an axial direction. A hollow tube 352 is secured in the long leg 348 and projects radially outwardly into the radially inwardly extending groove 262. The short leg 350 has an opening formed in the front surface 96 of the annual disk member 80 and is located closer to the axis of the annular disk member 80 than the opening for the short leg 336. A hollow tube 354 is secured to the inner surface 282 surrounding the opening 322 and projects radially inwardly therefrom. A hollow flexible tube 356 has one end 358 thereof secured to the hollow tube 352 and the other end 360 thereof secured to the hollow tube 354.

The manifold means for FIGS. 12–22 are substantially the same as the manifold means described above in relation to FIGS. 3–9 and similar parts have been given the same reference numerals. Since there are two moving belt conveyors 220a and 220b, two adjustment means 150a and 150b are provided and have parts similarly numbered and identified as a or b. Also, two conventional defective can discharge means 144a and 144b are provided. The annular manifold ring 116, FIG. 12, is secured to the front surface 96 of the annular disk member 80 and has a plurality of openings 118a, each of which is in alignment with the opening of each short leg 336, and a plurality of openings 118b, each of which is in alignment with the opening of each short leg 350. All of these parts function in the same manner as described above.

The radius of each of the openings 118a and 118b is selected so that each opening 118a and 118b will be in fluid communication with the arcuately shaped grooves 132, 138 and either 162a or 162b. The transfer wheel means 230 and the manifold means 120 are mounted so that as the annular disk member 80 rotates, each of the openings 118a and 118b passes over the arcuately shaped grooves 132, 138 so as to have a suction applied thereto and over the arcuately shaped groove 162a or 162b to have a puff of air applied thereto.

In operation, containers 214 are carried by the container carrying mandrels 212 so that the longitudinal axis of each container 214 is parallel to the axis of rotation 210 and the open ends 248 thereof are exposed. When a container 214 reaches location A with the longitudinal axis 216 of a container 214 aligned with a radius of the transfer wheel means 230, the suction being applied to the associated container carrying mandrel 212 is discontinued and suction is applied to a pad 286 having a planar surface 238a or 238b which is in juxtaposed relationship to the open end 248 of the container 214 so that the container 214 is transferred from the first container carrying wheel means 206 to the transfer wheel means 230 with the closed end 250 of each container 214 exposed. The mandrel wheel means 206 and the transfer wheel means 230 are rotated so that the pad 286 and the open end 248 of the container 214 being transferred are moving at about the same speed when the container is transferred from the first container carrying wheel means 206 to the transfer wheel means 230. After being transferred to a pad 286 having planar surface 238a or 238b, each container 214 moves in a circular path for the first fifteen degrees of rotation of the annular disk member 80. At that time, the cam means 300a will start to move the pads 286 with the planar surfaces 238a thereon in one linear direction parallel to the axis of rotation of the annular disk member 80 and the pads 286 having the planar surfaces 238b thereon in an opposite linear direction parallel to the axis of rotation of the annular disk member 80. When the cam means 300a and 300b stops the linear movement of the planar surfaces 238a and 238b, the containers 214 on the planar surfaces 238a are moving in one circular path and the containers on the planar surfaces 238b are moving in another circular path in parallel spaced apart relationship. Each container 214 then moves with a planar surface 238a or 238b until it reaches location B with the longitudinal axis 216 thereof in parallel relationship with the transverse axis 228. The suction being applied to the planar surface 238a or 238b is discontinued and the suction being applied through the conveyor belt 220a or 220b causes the container 214 to be transferred from the transfer wheel means 230 to the second container carrying means 218a or the third container carrying means 218b with the open end 248 of each container 214 exposed for the proper curing thereof. The second and third container carrying means 218a and 218b each have its own driving means so that it can move the containers thereon through the curing oven even if there is a break down in prior portions of the decorating system. Also, these conveyor means may be run at the desired speed for the proper curing thereof.

In one embodiment of the invention, each pad 286 has a length in an axial direction of about 5.75 inches and a width in a circumferential direction of about 4.0 inches. Each shaft 270 has a longitudinal length of about 7.75 inches and is mounted on the surfaces 260 to provide the relationship illustrated in FIG. 10. A pad 286 having a planar surface 238a thereon has the center of its opening 242 located two and one-quarter inches from the edge 362 and each shaft 270 associated therewith projects outwardly from the edge 362 a distance of two inches so that the slide assembly 290 may be moved over the shafts 270 a distance of two inches in one linear direction parallel to the axis of the annular disk member 80. A pad 286 having a planar surface 238b thereon has the center of its opening 242 located two and one-quarter inches from the edge 364 and each shaft 270 associated therewith projects outwardly from the edge 364 a distance of two inches so that the slide assembly 290 may be moved over the shaft 270 a distance of two inches in the opposite linear direction parallel to the axis of the annular disk member 80. When the containers 214 are being transferred to the second and third container carrying means 218a and 218b, the opening 242 in a planar surface 238a moving in one circular path and the opening 242 in a planar surface 238b is moving in another parallel circular path spaced apart a distance of four inches.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for transferring cylindrical containers or the like having a cylindrical container body portion and an open rim end portion and a closed bottom end portion between a first work station such as a container decorator or the like and second and third work stations such as ovens or the like comprising:

first continuously rotating container carrying means having a plurality of container supporting devices mounted thereon for receiving containers from the first work station and engaging the closed bottom end portion thereof and carrying the containers in a first circular path of movement in a first generally vertical plane about a central generally horizontal axis of rotation;

continuously rotating container transfer wheel means having a plurality of container supporting devices mounted in circumferentially spaced relationship on the circumferential peripheral surface thereof for receiving containers from said first container carrying means and engaging the open rim end portions thereof and carrying the containers in a second circular path of movement in a second generally vertical plane, which is transverse to said first generally vertical plane, about a second central generally horizontal axis of rotation which is transverse to said first axis of rotation and which includes a path portion adjacent said first container carrying means whereat the containers are transferred to said container transfer wheel means from said first container carrying means;

said container transfer wheel means having separating means for separating said containers in said second circular path into two parallel spaced apart circular paths;

spaced apart second and third continuously moving container carrying means having container supporting means thereon for receiving containers from said container transfer wheel means and engaging the closed bottom end portion thereof and carrying the containers to said second and third work stations along paths of movement, said paths of movement including linear path portions adjacent said circumferential peripheral surface means on said container transfer wheel means whereat the containers re transferred from said container transfer wheel means to said second and third continuously moving container carrying means;

wherein said plurality of container supporting devices on said container transfer wheel means comprises:

a plurality of equally circumferentially spaced pads having a generally planar surface of a larger area than the cross-sectional area of said containers so as to enable each of said pads to abuttingly engage the open rim end portion of one of the containers;

vacuum supply means for each of said generally planar surfaces of said pads for supplying vacuum thereto to hold a container thereon during transfer from said first container carrying means to said second and third container carrying means; and moving means for moving each of said plurality of pads in a linear path parallel to said axis of rotation of said second container transfer wheel means;

said plurality of pads are successively numbered as odd and even numbered pads; and said moving means moves said odd numbered pads in a linear path in one direction and said even numbered pads in a linear path in an opposite direction.

2. The invention as defined in claim 1 and further comprising:

each of said pads ring secured to and form a part of a slide assembly, said slide assembly having at least one bearing block;

at least one bearing in said bearing block;

at least one elongated shaft means extending through said bearing so that said bearing block can slide on said at least one elongated shaft means; and mounting means for mounting each of said shaft means on said peripheral surface of said container transfer wheel means.

3. The invention as defined in claim 2 wherein said moving means comprises:

a pair of spaced apart annular cam means for guiding the movement of each of said slide assemblies; and cam follower means secured to each of said slide assemblies and being located in one of said annular cam means for moving adjacent slide assemblies in said opposite linear directions.

4. The invention as defined in claim 3 wherein:

said at least one bearing block comprises a pair of spaced apart bearing blocks;

said at least one bearing comprises a pair of spaced apart bearings; and said at least one shaft means comprises two spaced apart shaft means.

5. The invention as defined in claim 4 and further comprising:

each of said plurality of pads having connecting means for connecting each of said segments to said vacuum supply means;

manifold means mounted for operational relationship with said second container transfer wheel means for providing a vacuum for each of said plurality of pads; and said manifold means being connected to said vacuum supply means.

6. The invention as in claim 5 wherein said connecting means comprises:

a passageway extending through each of said plurality of pads;

said container transfer wheel means comprising a disk having said circumferential peripheral surface and at least a front surface;

a first and second plurality of L-shaped passageways in said disk, each having at least one leg thereof extending in a radial direction and having an open end in said circumferential peripheral surface;

flexible tube means for connecting said open end of said one leg to each of said odd and even numbered pads;

the other legs of said first plurality of L-shaped passageways having a first plurality of openings in said front surface and said openings are spaced equidistantly from said axis of said second container transfer wheel means;

the other legs of said second plurality of L-shaped passageways having a second plurality of openings in said front surface and said openings are spaced equidistantly from said axis of said second container transfer wheel means;

said second plurality of openings being spaced radially inwardly from said first plurality of openings;

a ring shaped member having a plurality of holes extending therethrough secured to said front surface;

said ring shaped member secured to said front surface so that half of said holes are aligned with said first plurality of openings and the other half of said holes are aligned with said second plurality of openings; and said ring shaped member having an annular exposed surface that is relatively smooth and planar for cooperation with said manifold means in supplying vacuum to each of said plurality of pads.

7. The invention as defined in claim 6 and further comprising:

said manifold means fixedly mounted in juxtaposition to said ring shaped member and having a surface slidably engaging said exposed surface of said ring shaped member to enable rotation of said ring shaped member relative to said manifold means;

arcuate groove means in said manifold means located to be in alignment with said holes in said ring shaped member during a portion of the rotational movement of said ring shaped member to enable vacuum to be applied to said holes;

at least one vacuum supply port connected to said arcuate groove means; and mounting means for holding said manifold means in circumferentially fixed relationship to said ring shaped member.

8. The invention as defined in claim 7 wherein:

one end of said arcuate groove means is mounted at a location to provide said manifold beginning means; and the other end of said arcuate groove means is mounted at a location to provide said manifold ending means.

9. The invention as defined in claim 7 wherein said vacuum supply means comprises:

a plurality of support members;

each of said plurality of pads mounted on one of said support members;

a first opening extending through each of said pads;

a second opening extending through each of said support members;

a recess in said support member and forming a passageway extending in a linear direction between said first and second openings; and said flexible tube means connected to said second opening.

10. The invention as defined in claim 9 wherein:

said flexible tube means being located between said two spaced apart shaft means.

11. The invention as defined in claim 7 and further comprising:

force applying means located at said manifold ending means to apply a force to each of said containers so as to ensure that teach of said containers is transferred to said at least second or third container carrying means.

12. The invention as defined in claim 11 and further comprising:

adjusting means for varying the location of said force applying means and the location of said manifold ending means.

* * * * *